June 2, 1970          H. AGUILAR          3,515,193
ONION ORIENTER AND CUTTER
Filed Oct. 9, 1967          4 Sheets-Sheet 1
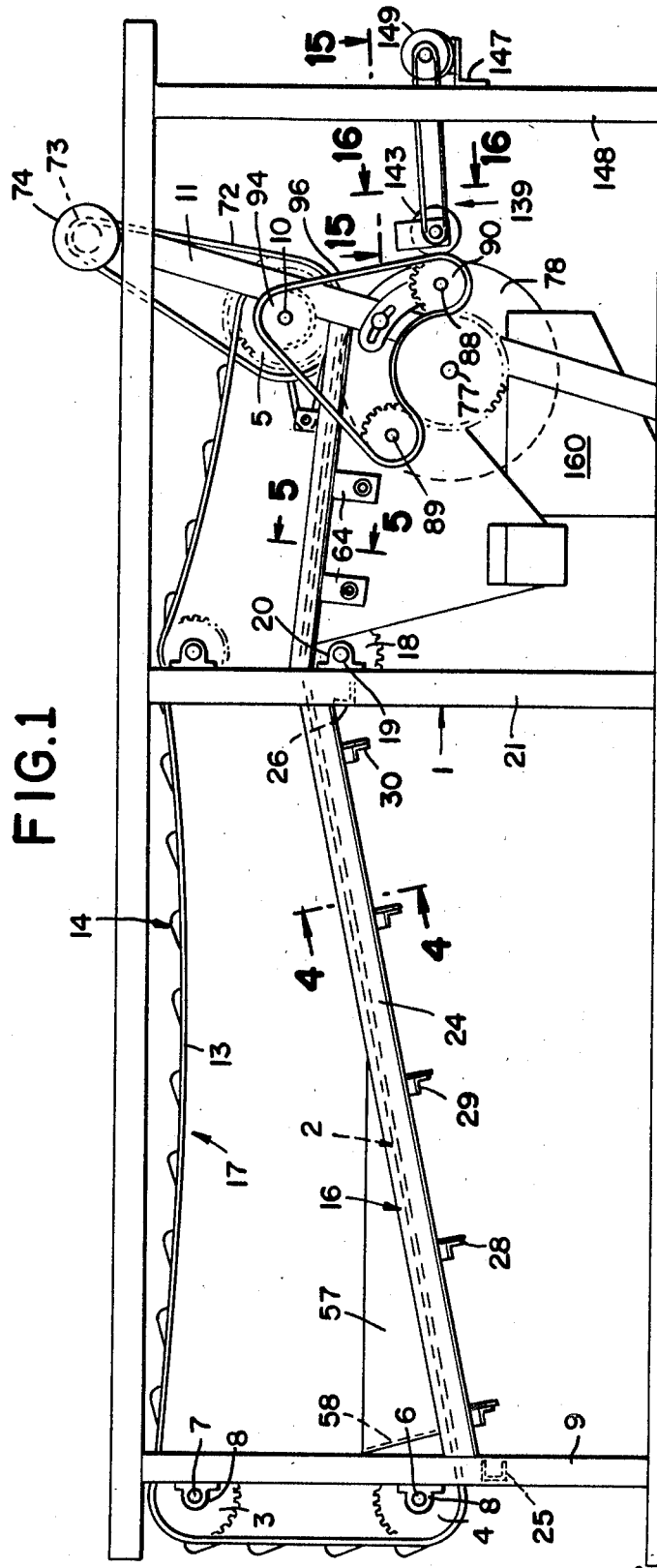
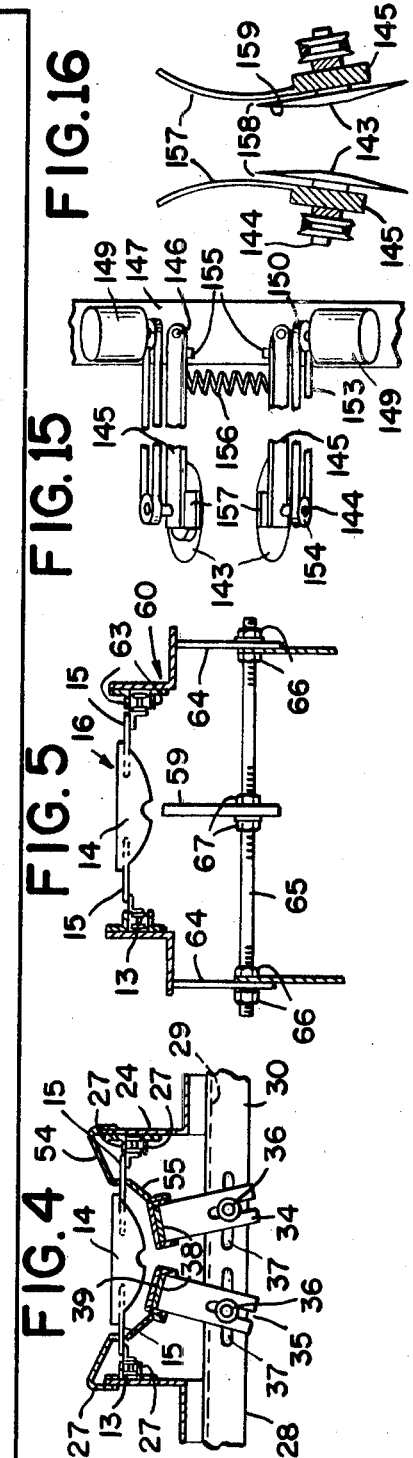
INVENTOR.
HENRY AGUILAR
BY Boyken, Mohler, Foster & Schlemmer
ATTORNEYS

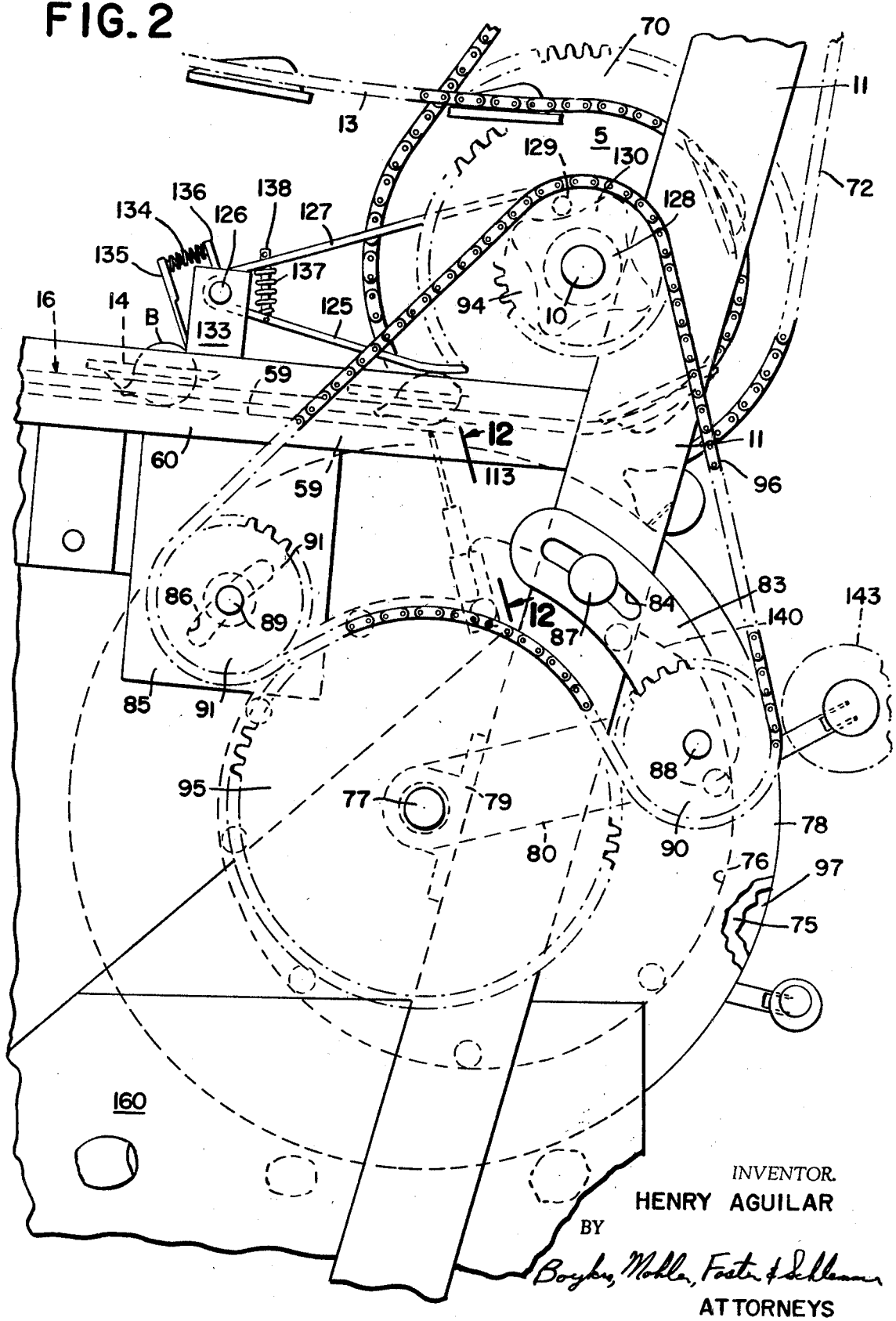

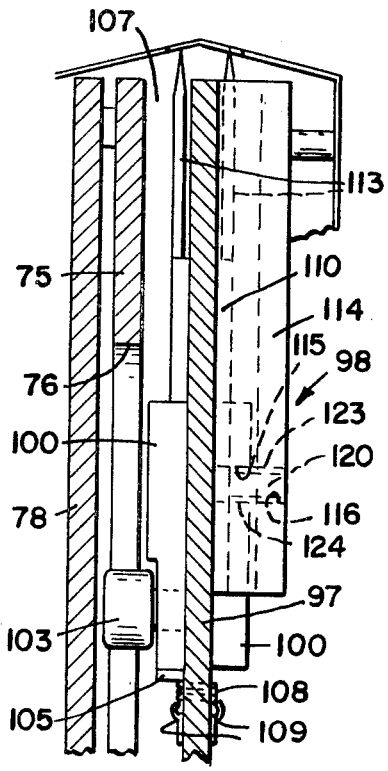
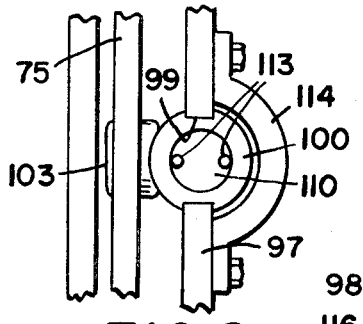
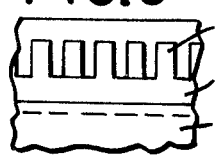
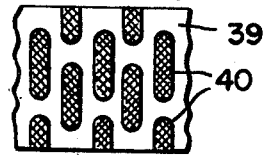
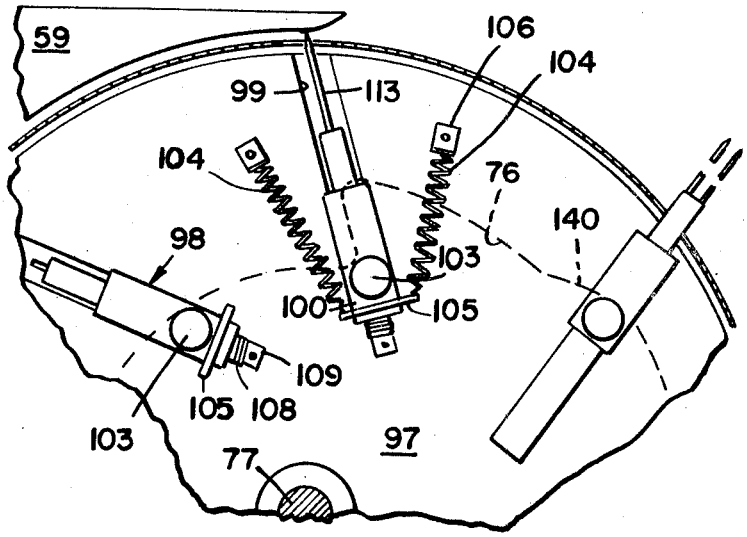
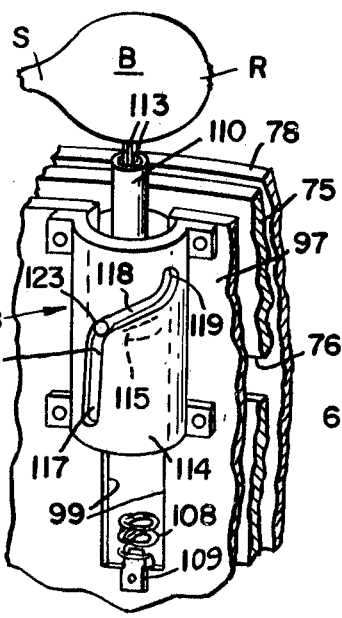
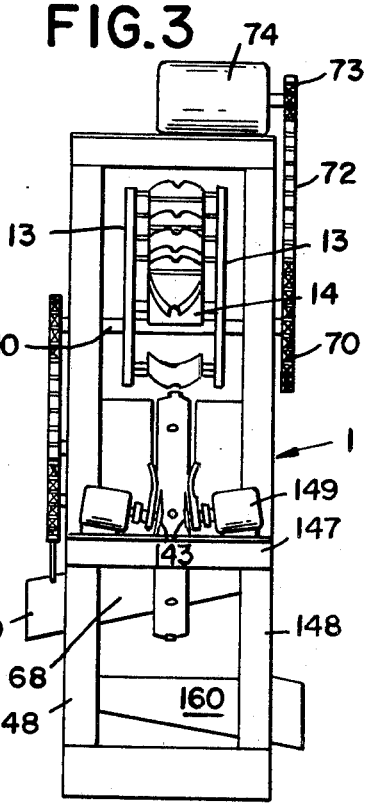

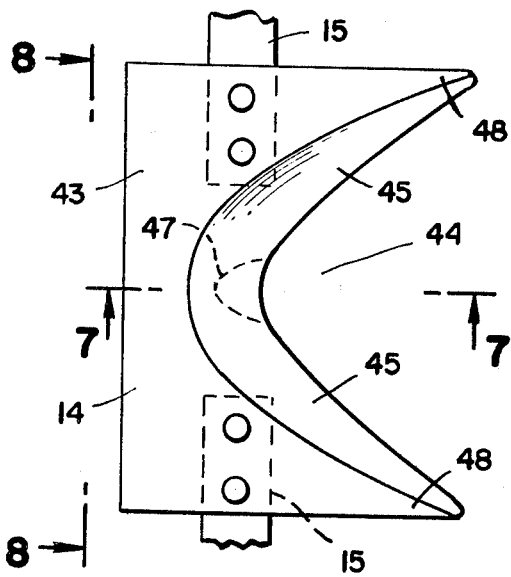
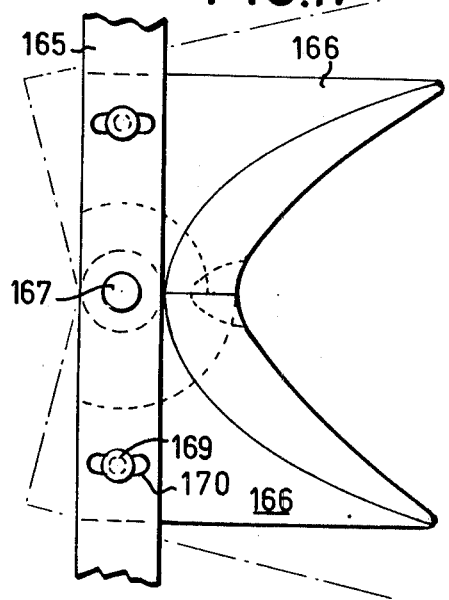
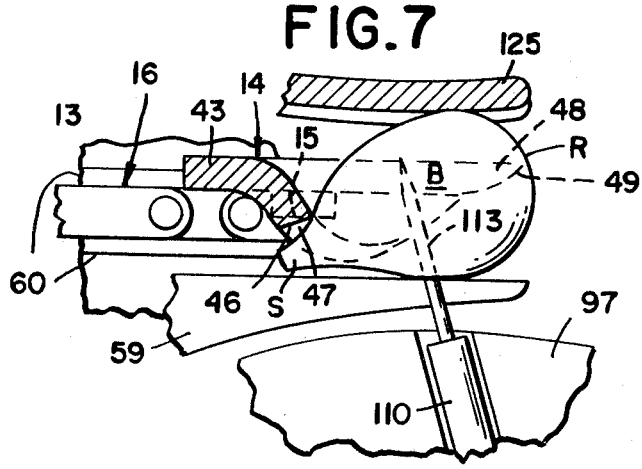
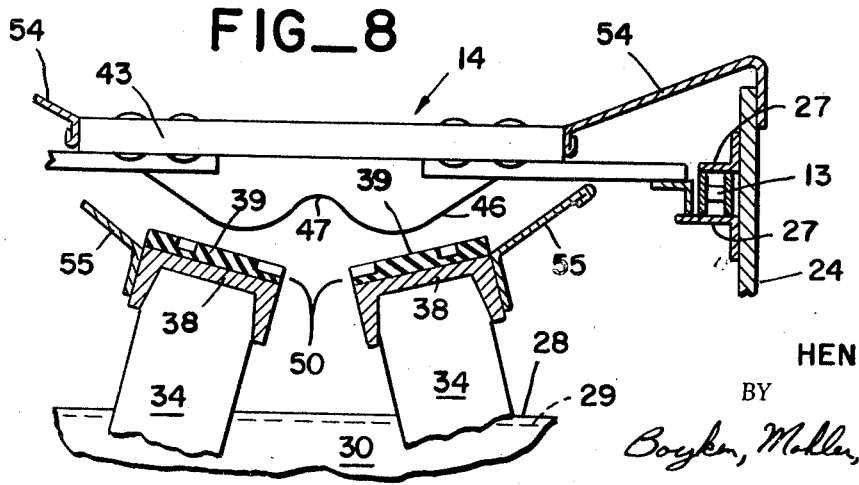

United States Patent Office 3,515,193
Patented June 2, 1970

3,515,193
ONION ORIENTER AND CUTTER
Henry Aguilar, San Francisco, Calif., assignor to Basic Vegetable Products, Inc., San Francisco, Calif., a corporation of California
Filed Oct. 9, 1967, Ser. No. 673,584
Int. Cl. A23n 15/04
U.S. Cl. 146—224    12 Claims

ABSTRACT OF THE DISCLOSURE

Apparatus for orienting onions and products of similar characteristics, of different sizes relative to their root-stem axes, and to conduct said onions to a cutting station for severing the root-bases and stem portions from the intermediate body portions at uniform depths within the latter. Means is provided to automatically separate unoriented onions and others prior to said severance. The long tops and root tendrils have normally been removed prior to orientation, leaving the stub stems and root-bases, the former projecting from the body.

Background

Heretofore onions of different sizes have been difficult to orient rapidly and accurately, resulting in waste of the product, costly inspection expense, time loss in rehandling improperly cut onions, and high maintenance costs.

Onions for dehydration normally have their long tops and roots removed after harvesting, but before skinning and slicing, the remaining projecting stub-stems and the root-bases must be cut off.

Orientation of the onions relative to their root-stem axes prior to the final severance of the stub-stems and root-bases has heretofore either depended upon hand positioning of the onions in holders, which is relatively slow and expensive, or the employment of a conveyor of rotating pairs of rollers. In both instances, the maintenance is high and the operation uncertain due to juice from the onions at the severing and cutting station coating and gumming parts of the carrier and orienting mechanism, resulting in improperly sliced onions.

In the present invention, the general principle for orienting onions is disclosed in my prior U.S. Pat. No. 3,212,545, of Oct. 19, 1965, in that the body of the article is pushed over a friction surface until the stem is in trailing position at which point the body is oriented and will be held in oriented position for further processing. In the case of an onion, however, the stub-stem is relatively thick, short, and relatively rigid with the body of the onion compared with the flexible stem on most fruit.

In the persent machine, the volume per each cutting unit is high and the construction lends itself to providing a compact machine having a plurality of units to meet any demand, and the machine is adapted to accurately align the onions within a short space of travel and to automatically separate any that may not be properly aligned due to abnormal variations in shape. Also, the machine includes means adapted to sever the stem and root bases uniformly, irrespective of variations in the sizes of the onions, and to operate on a larger volume per minute than heretofore, and which means is positioned relative to the orienting means and holder for each onion so that any juice freed by the cutting operation will not gum the operating parts of the machine or impair the operation of the machine.

Description of drawings

FIG. 1 is a side-elevational view of the apparatus.
FIG. 2 is an enlarged elevational view of most of the right-hand end portion of the apparatus shown in FIG. 1.
FIG. 3 is a reduced size, simplified end-elevational view of the apparatus as seen from the right-hand end, certain structural details being omitted for clarity.
FIG. 4 is an enlarged fragmentary cross-sectional view along line 4—4 of FIG. 1.
FIG. 5 is an enlarged fragmentary cross-sectional view along line 5—5 of FIG. 1.
FIG. 6 is an enlarged top plan view of one of the article engaging and moving elements.
FIG. 7 is a cross-sectional view of the element of FIG. 6 along line 7—7 of FIG. 6, but showing an onion positioned by the element and impaled on the transfer device at the right hand end of FIG. 1. Also, fragments of associated parts are indicated.
FIG. 8 is a rear end-elevational view of the element of FIG. 6 as seen from line 8—8 of FIG. 6, and it includes portions of the adjacent structure shown in FIG. 4, but enlarged and in section.
FIG. 9 is a fragmentary side-elevational view of the portion shown in FIG. 10, with a portion of the wall beyond and the support shown.
FIG. 10 is a fragmentary top-plan view of a portion of the stationary article supporting surface over which articles are moved.
FIG. 11 is a fragmentary view, partly in section, of a portion of the article impaling and transfer means shown in FIG. 2, one of the elements shown in FIG. 11 being indicated in dotted line in FIG. 2. The dot-dash lines indicate the position of the cam track, relative to cam followers, the cam being at the near side and not being shown.
FIG. 12 is an enlarged fragmentary cross-sectional view taken along line 12—12 of FIG. 2.
FIG. 13 is a fragmentary top-plan view of the portion shown in FIG. 12, the top cover plate being omitted.
FIG. 14 is a fragmentary perspective view of a portion of the device shown in FIG. 11 as seen from the right-hand side of the latter.
FIG. 15 is an enlarged top-plan view of the cutting means as seen from line 15—15 of FIG. 1, but broken in length.
FIG. 16 is a cross-sectional view along line 16—16 of FIG. 1.
FIG. 17 is a modified form of the article-engaging and moving means shown in FIGS. 6–8.

Description of the embodiment

As reference has been made, and will hereafter be made, to parts of onions adapted to be handled by the apparatus, a representative onion is shown in FIG. 7 in which the stem end is designated S and the root end R and the body B. The use of the apparatus is not intended to be restricted to onions, as there may be other articles or produce with which it may be used.

Referring to FIG. 1, a frame generally designated 1 supports an endless, generally horizontally extending conveyor 2 that is supported at one end for movement around vertically spaced pairs of sprocket wheels 3, 4, and at the other end on a pair of sprocket wheels 5.

Sprocket wheels 4 are a coaxial pair secured on a horizontal shaft 6 in spaced relation; wheels 3 are in a pair on a shaft 7 spaced above wheels 4. Bearings 8 support said shafts on vertical posts 9 at one end of frame 1, while wheels 5 are on a shaft 10 supported in bearings on a generally vertically extending frame member 11 at the opposite end of the machine.

The end of conveyor 2, adjacent to sprocket wheels 3, 4, will be called the "feed" end, while the end adjacent to wheels 5 will be called the "discharge" end.

The conveyor, itself, includes a pair of endless chains 13, extending over said pairs of sprocket wheels 3–5, and between said chains at uniformly spaced points are onion engaging, moving, and orienting elements 14 (FIGS. 1–8), each being secured on the adjacent end portions of a pair of horizontally aligned bars 15, (FIGS. 4, 5), the opposite ends of which bars are connected to correspondingly opposed pairs of links on the chains.

The lower run of the conveyor is designated 16, while the upper run is designated 17. The lower run of the conveyor is the operating run, and the spacing between sprockets 3, 4 at the feed end separates the runs to provide a space for bulk feeding of onions onto the lower run of the conveyor.

Commencing at the feed end, or from sprocket wheels 4, the lower run 16 of the conveyor extends upwardly at an incline to, and over coaxial sprocket wheels 18 that are on a shaft 19, rotatable in bearings 20, which bearings, in turn, are secured to upstanding posts 21 of frame 1.

A pair of angle strips 24 (FIGS. 1, 4) are supported at their ends on cross frame members 25, 26 (FIG. 1) respectively secured to and extending between posts 9, and posts 21, and one of the vertical legs of said strips support guide strips 27 (FIGS. 4, 8) to provide oppositely opening channels within which the chains 13 are slidably supported for maintaining said chains at their upwardly inclined positions.

Cross pieces 28 (FIGS. 1, 4), in the form of angle strips, extend below the strips 24 at spaced intervals, the angle strips each being positioned so one leg 29 is uppermost and parallel transversely thereof with strips 24, while the other leg 30 transversely thereof is perpendicular to the length of strips 24 (FIG. 1). The strips 24 are secured to the cross pieces 28 at the ends of the latter, and a pair of convergently upwardly extending elongated strips 34 (FIG. 4) are secured against the flat outer side of each leg 30. Elongated slots 35 extend longitudinally of each piece 34, and a bolt 36 extends through each slot and through horizontal slots 37 formed in each leg 30 of each cross piece 28 for securely bolting each piece 34 to each cross piece 28 while permitting adjustment of each piece 34 upwardly, laterally and at different degrees of inclination relative to horizontal.

The pieces 34 are in two rows extending longitudinally of the lower run 16 of the conveyor, and below the latter an elongated support 38 (FIG. 8) parallel with angle strips 24, is secured on the upper ends of the pieces 34 of each row thereof. Strips 39 are secured on the upper sides of the supports 38, longitudinally thereof, which strips 39 have onion-engaging upper friction surfaces in the form of flexible, rubber or rubber-like projections 40 (FIGS. 8, 9, 10) extending upwardly from the strips. These projections may be finger-like or elongated transversely of each strip 39 in rows extending longitudinally of the strip, but in staggered relationship with the adjacent staggered projections in lapping relation longitudinally of the strips (FIG. 10).

Supports 38 and strips 39 are inclined transversely of their lengths (FIG. 4) to extend divergently upwardly relative to each other, and are spaced apart at their lower edges to provide a generally V-shaped channel, open at the apex, for supporting onions thereon.

In top plan view along lower run 16, each onion engaging and moving element 14 comprises a body having an upper portion 43 (FIGS. 6–8) that is parallel with chains 13 of conveyor 2, and which body is formed to provide a generally horizontally disposed, forwardly opening V-shaped recess 44 (FIG. 6), the side surfaces 45 of which are of progressively greater vertical width from the forward end of the recess rearwardly toward the apex of the V. The uppermost surface of each element 14 is parallel with the chains 13 and the portion 43 includes flanges extending horizontally laterally and rearwardly from a downwardly projecting portion 46 in which the rear and side surfaces 45 of the V-shaped recess are disposed. Said side surfaces are inclined relative to horizontal and vertical to face generally laterally and upwardly. A downwardly opening notch or recess 47 (FIGS. 7, 8) is formed in part 46 at the apex of the recess 44.

Flat bars 15 extend below and are rigidly secured to flange portion 43 at points at opposite sides of the rear end of the downwardly projecting portion 46, and which points are intermediate the forward and rear ends of element 14. The surfaces 45 of the recess 44 at the apex thereof are rounded (FIG. 6).

The upper flange portion 43 provides forwardly extending legs, the adjacent sides of which define sides of the V-shaped recess, and said legs have terminal forward ends 48 that are preferably rounded at 49 on their under sides (FIG. 7).

The bars 15 support each element 14 spaced above the projections on strips 39 of the lower run 16 with the downwardly opening recess or notch 47 over the space 50 (FIG. 8) between the pair of strips 39 on which the onions are supported.

The width of the recess 47 is greater than the outer end of each stub stem S on the body B of each onion (FIG. 7), therefore the stem S is adapted to project into recess 47 when the onion is between the sides of the V provided by an element 14, and when the stem is in said recess it will stay there with the body B in leading position as the element 14 is moved forwardly on strips 39.

Secured to the upstanding legs of angle strips 24 are walls 54 (FIG. 8) that extend convergently downwardly toward and relatively close to the upper planar surfaces of the elements 14. These walls extend over chains 13 and cross bars 28, and similar walls 55 are secured to the oppositely outwardly facing sides of the pairs of supports 38 for strips 39. These latter walls extend upwardly and outwardly from said supports past the spaces between elements 14 and the lower edges of walls 54.

Said walls 54 and 55 extend lengthwise from the lower end of run 16 of conveyor 2 up the inclined portion thereof to sprockets 18.

At the lower end of the lower run 16 of the conveyor, are upstanding side walls 57 (FIG. 1) secured along their lower edges to the angle strips 24, which walls are widest adjacent to the posts 9, to which they may also be secured and they taper in a forward direction. A flexible apron 58 depends from a bar extending between the upper edges of the lower portions of said walls 57 across the space between said walls to act as a closure against onions fed into the space between said walls 57 falling rearwardly out of the space between the latter. The lower portion of the apron, or rear wall 58, will flex upwardly to pass the onion moving elements 14.

The operation of the apparatus from the lower end of run 16 of the conveyor to sprockets 18 will be described.

Onions, such as shown in FIG. 7, are deposited by any suitable conveyor or means between side walls 57, and one will automatically be positioned ahead of each element 14 to be pushed up the inclined strips 39. The body of each onion so pushed will roll on stationary strips 39 until the stem S is received in recess 47, and it may project into the space between the strips 39, but once the stem is in recess 47, the onion will be pushed on strips 39, with the body 13 in leading position. The stem S, during rolling on the strips 39, may swing through space 50 between elements 39 or they may be guided below the surfaces 49 of the pointed forward ends of the element 14.

By the above arrangement, the onion aligning portion of the apparatus is along the lower run 16 extending between sprockets 4 and 18.

At sprockets 18, and forwardly thereof, the lower run of the conveyor 2 extends slantingly downwardly relative to horizontal, but the inclination is relatively slight compared to the previous upward incline. The position of the supporting bar 15 intermediate the forward and rear ends of each holder, enables the holder to rock only slightly as the holders pass sprockets 18.

Friction strips 39 terminates at sprockets 18, and thereafter a central onion supporting rail 59 (FIG. 5) is provided, which rail is in a vertical plane that bisects the space between chains 13. This rail may be in the form of a vertical plate, the upper edge of which is parallel with chains 13, and is directly below the notches or recesses 47 in the elements 14 (FIG. 5). Whether this rail is part of a plate, rod, or the like, it preferably has a flat, upper edge. FIG. 7 shows the position of an onion when on the rail with the stem-root axis tilted relative to horizontal and relative to chains 13 when the stem end is in recess 47. The upper onion-supporting edge of the rail 59 is inclined slightly downward in the direction of movement of the onions.

Onions that have not been aligned or that are improperly aligned will roll forward and fall to one side or the other of the rail 59 but those in proper alignment and with their stem ends in a recess 47, will not roll forwardly but will be slid along the rail longitudinally of the latter.

Angle strips 60 (FIG. 5), similar to strips 24, are in extension of the latter at the forward ends of strips 24, but are inclined downwardly in a forward direction the same as the lower run of conveyor 2. Chain supporting guide strips 63 on the angle strips 60 support chains 13 of conveyor 2 for forward movement.

A pair of vertically extending, horizontally spaced plates 64 are below and are secured to strips 60, and threaded, horizontal rods 65 are adjustably secured at their ends to plates 64 by nuts 66, the threaded ends of said rods extending through openings in said plates. Each rod also extends through an opening in the rail 59 and nuts 67 on the central threaded portion of each rod 65 adjustably secure the rail 50 in position below elements 14.

A hopper 68 (FIG. 3) below rail 50 receives onions that fall from the rail for return to the feed end of the conveyor by any suitable means, not shown. Said rail extends from the upper end of the aligner portion of the conveyor to a point adjacent to sprocket 5, and the hopper 68 extends the length of the rail and has a side outlet 69 (FIG. 3).

The conveyor chains 13 (FIG. 1) as already described, extend around the sprocket wheels 5 and back to sprockets 3 and 4.

Shaft 10 also has a sprocket wheel 70 (FIG. 2) secured thereto, and a chain 72 connects sprocket wheel 70 with a sprocket wheel 73 (FIGS. 1, 3) driven by motor 74 for actuating the conveyor.

Below the sprocket wheel 5, and also rigid with end frame member 11 is a cam 75 (FIG. 2) having an internal cam track 76 and which cam track extends around a shaft 77 that, in turn, is rotatably supported on frame members 11 (FIG. 1).

The cam 75 is rigid with a circular plate 78 (FIG. 2) that, in turn, is supported on shaft 77 by hub 79 (FIG.2), which hub, in turn, includes a radially outwardly extending arm 80 having a lateral projection 83 thereon formed with an arcuately extending slot 84 that is coaxial with shaft 77.

Spaced rearwardly relative to arm 80 is a bracket 85 (FIG. 2) rigid with one of the strips 60 and depending therefrom, which plate is formed with an arcuately extending slot 86, that is also coaxial with shaft 77.

A bolt 87 (FIG. 2) rigid with one of the frame members 11 extends through slot 84 and adjustably secures the projection 83, and consequently cam 75, stationary in one of a plurality of positions around shaft 77.

A stub shaft 88 (FIG. 2) is rigid with arm 80 at approximately the juncture between said arm and the projection 83, said shaft projects outwardly of the arm in a direction away from cam 75 and parallel with shaft 77. A similar stub shaft 89 on plate 85, parallel with shaft 88, projects outwardly of said plate and is adjustable to different positions along slot 86. A sprocket wheel 90 is rotatable on shaft 88 and a corresponding sprocket wheel 91 is rotatably supported on shaft 89. Shaft 10, which is above sprocket wheels 90, 91, has a sprocket wheel 94 secured thereon, and a relatively large sprocket wheel 95 is secured on shaft 77.

A sprocket chain 96 extends around the sprocket wheel 94, that is driven by chain 73 at the same time the conveyor chains 16 are driven, and around idler sprocket wheels 90, 91. The length of said chain extending between the wheels 90, 91 extends over, and in driving relation with sprocket wheel 95.

By this arrangement, the position of the cam 75 and its track 76 around the shaft 77 may be changed.

Rotatably supported on shaft 77 is a circular plate 97 (FIGS. 11–13) that is coaxial with the plate 78, and which plate 97 carries an annular row of equally spaced onion impaling devices, and transfer devices, each being generally designated 98 (FIGS. 11–14), and each being adapted to transfer onions from the conveyor 2 past cutters (later described) for severing the stem and root portions from the body B of each oriented onion.

As seen in FIGS. 11, 13, 14, the plate 97 is formed with an annular row of outwardly opening, corresponding slots 99, and which slots are on lines extending generally tangentially of a circle coaxial with shaft 77. A slide 100 is reciprocable in each slot 99 longitudinally of the latter, said slides being grooved on opposite sides (FIG. 13) to receive the sides of the slots and each slide carries a roller 103 that is adapted to engage the stationary cam track 76 (FIG. 12).

A pair of of helical springs 104 (FIG. 11) are connected at one of their ends to a piece 105 on the inner end of each slide 100 and at their opposite ends to lugs 106 on the transfer plate adjacent to the outer periphery of the latter for yieldably maintaining roller 103 against cam track 76. Said springs 104 are positioned in the space 107 (FIG. 11) between the cam 77 and the stationary plate 78 and is omitted in FIG. 11 to avoid confusion in the drawing.

Secured within the inner end of each slot 99 is a short coil spring 108 (FIGS. 11, 12) that is adapted to be compressed by each slide when the latter is at its innermost retracted position in each slot. Clips 109 secured to plate 97 at the lower or closed end of each slot 99 secure the springs 108 in their positions.

Each slide 100 is shown as being cylindrical, and elongated longitudinally of the slot in which it is positioned, and a cylindrical elongated tine carrying member 110 (FIG. 13) is rotatable within each slide 100. Each member 110 has a pair of parallel impaling tines 113 in spaced side-by-side relation projecting outwardly of the outer end thereof.

The outer end of each tine carrying member 110 from which the tines 113 project is spaced a substantial distance from the outer pointed ends of the latter. The words "outer," "outwardly," "inner" and "inwardly" used with respect to the transfer devices 98 relate generally to positions relative to the axis of shaft 77.

At the side of the transfer plate 97 opposite to the cam plate 75, a semi-cylindrical member 114 (FIGS. 12–14) is permanently secured to said transfer plate and it extends longitudinally of the tubular slide 100. The side of the slide opposite to cam plate 75 projects into the semi-cylindrical side of the member 114 and the side of said slide 100 that so projects into the member 114 is formed with an elongated slot 115 (FIG. 12) that is in a plane perpendicular to the axis of the slide 100 and the tine carrying element 110.

The member 114 (FIG. 14) is also formed with a slot 116 that extends parallel with the axis of said slide member 100 from its inner end for a distance, as at 117, and the slot then continues outwardly at an angle, as at 118. and terminates in short end portion 119 that again extends generally axially, or radially relative to axis of shaft 77.

Secured to the tine carrying member 114 is one end of a pin 120 (FIG. 12) having rollers 123 and 124 rotatable thereon, which pin projects through slots 115 and 116 and roller 123 is in slot 116 while roller 124 is in slot 115. By this arrangement the sides of slot 116 provide cam surfaces and roller 123 therein is the cam follower, while roller 124 functions to retain the tine carrying member 114 and slide 100 for movement together generally radially of the plate 97. The cam tracks provided by the sides of slot 116 result in the tine carrying member being rotated through a quarter turn as the roller 123 moves through the angular portion 118 of slot 116.

The cam track 76 and follower 103 control the axial movement of each slide 100 and each tine carrying member 110 associated therewith, while cam slot 116 and the follower 123 therein controls the rotation of the tine carrying member 110.

Upon rotation of the transfer plate 97 clockwise as seen in FIG. 7 the onion or article engaging member 14 will sucessively move an onion B on the rail 59 to a position over the transfer plate 97, and the stem-root axis of the onion will be tilted to a position substantially at a right angle to the longitudinal axis of each tine carrying member 110 when the body B of the onion is moved to a position over tines 113. The tine carrying member 110 and tines 113 thereon are retracted (FIG. 11) so as not to engage an onion moved over the tines until the onion is in the proper position for impalement of the body by the tines, and the pair of tines of each impaling device are adapted to straddle the forward end of rail 59 when the tines impale the onion (FIG. 7).

As best seen in FIG. 11, one roller 103 has reached the point on cam track 76 at which the slide 100 and tine carrying member 110 is to be released to impale an onion on the forward end of the rail 59 and FIG. 7 shows the onion body B impaled by tines 113.

In order to firmly hold the onion body B while it is impaled by tines 113, the forward end of a hold-down arm 125 is adapted to yieldably engage the upper side of the onion at a point that is nearer the root end R than the stem end B. This is the uppermost point on the tilted body of the onion, as seen in FIG. 7, and as the upward thrust of the tines is intermediate the point of engagement between the hold-down arm 125 and the body of the onion, and the point in notch or recess 46 engaged by the stem portion 5, the onion will be held against rocking during impalement.

A horizontal pivot 126 (FIG. 2) supports the rear end of the hold-down arm 125, and the same pivot pivotally supports the rear end of an upper arm 127 that extends divergently upwardly and forwardly relative to arm 125 to a position over shaft 10 and over a cam 128 secured on shaft 10. A cam follower 129 is secured on the forward end of arm 127, which follower is in engagement with cam 128. The latter is formed with radially outwardly projecting correspondingly shaped lobes 130.

Supports 133 on angle strips 60 support the pivot, and an expansion spring 134 reacts between a cross piece 135 that extends between and connects said supports, and a short projection 136, integral with upper arm 127 for yieldably holding follower 129 into engagement with the cam 128.

An expansion spring 137 between arms 125, 127 forwardly of pivot 126 is positioned around a limit-pin 138, which spring 137 yieldably holds arms 125, 127 expanded to the limit permitted by the limit-pin 138, while permitting arm 125 to be yieldably urged against onions of different sizes during impalement of such onions.

Cam 128 is rotated with shaft 10 and it is synchronized with conveyor 2 to lower the arm 125 into yieldable engagement with each onion during impalement by each pair of tines 113, and the arm 125 is elevated by operation of lobes 130 immediately after such impalement. Preferably the arm 125 is of generally inverted V-shape (FIG. 7) in cross-sectional contour at its outer end to hold each onion centered therebelow upon the arm engaging each onion.

Cam follower 103 on slide 100 will be released immediately upon the follower moving forwardly relative to cam track 76 a very slight distance from the position of the follower as indicated in FIGS. 2, 11, and in FIG. 7 this movement has been completed and the roller or follower 103 has been released and the tines 113 have impaled the onion.

At this point, the rollers 123, 124 on the pin 120 have moved radially outwardly to the limit of portion 117 of slot 116 (FIG. 14) without rotation of the slide 100 and tine carrier 110. Cam track 76 (FIG. 11) is concentric with the axis of shaft 77 until the onion is clear of the element 114 and is being moved toward the stem and root severing cutter assembly generally designated 139 (FIG. 1).

Prior to the tine carrier 110 reaching the cutter assembly 139, cam track 76 extends outwardly at 140 (FIGS. 2, 11) causing follower 103 and rollers 123, 124 to move radially outwardly, and the roller 123 (FIG. 14) will enter portion 118 of slot 116 to effect a 90-degree rotation of the slide 100 and the tine carrier 110 will at the same time carry the onion radially outwardly of the cam 75, plate 78, and transfer plate 97. In this position the root-stem axis of each onion is at a right angle to its position at the time of impalement.

The onion will be carried in its new position in an annular path around the axis of shaft 77, past the stem and root severing assembly, where the stem and root portions will be severed.

This cutter assembly comprises a pair of circular cutting blades 143 (FIGS. 1, 15, 16), disposed in spaced generally opposed relation.

Each of the blades 143 is secured on one of the adjacent ends of a pair of shafts 144, which shafts extend approximately outwardly of the pair of blades 143 and are rotatably supported in one of the end portions of a pair of substantially parallel arms 145 (FIGS. 1, 15, 16). The opposite ends of arms 145 are pivotally supported on generally vertical pivots 146 on a cross frame member 147 (FIGS. 1, 15) extending between posts 148 (FIG. 1) at the forward end of the machine.

Each of a pair of motors 149 supported on frame member 147 has a pulley 150, which pulley is connected by a belt 153 with a pulley 154 on each shaft 144 for rotating blades 143 in the same direction, and at the same speed.

Stop elements 155 (FIG. 15) on frame member 147, limit the movement of arms 145 toward each other, and a coil spring 156 connecting said arms yieldably hold them, and blades 143 in spaced relation with the arms against said stop elements 155 until the arms and cutters are moved apart by an onion carried to the cutters.

A pair of spaced opposed onion engaging strips 157 (FIG. 16) are respectively secured to the arms 145 adjacent to the oppositely outwardly facing sides of said pair of cutters 143 and these strips project toward the oncoming onions after they have been rotated by rotation of the tine carrying elements, the outer end portions of said strips of said pair being curved away from each other and at opposite sides of the path of travel of the body of each onion so as to engage the stem and root ends of each onion before the latter reaches the cutters. The space 158 (FIG. 16) between each strip and the cutting blade adjacent thereto at the edge of the cutter that severs the stem or root end portion of the onion determines the depth of the cut into the body of each onion, irrespective of the length of each onion in the direction of its root-stem axis.

It is important that the cut faces of each onion rapidly clear the blades 143 so they may return to normal spaced relation before the next onion is cut. The degree of functional resistance between the strips 157 and the onions must not be sufficient to loosen the onions on the tines; hence, the tension of spring 156 must not be too great.

The rapid clearance of the onions between the circular blades 143 is effected by dashing the blades and tilting them relative to each other as seen in FIG. 16 so that the marginal surfaces 159 of the opposed faces of the pair of blades between which each onion initially passes are parallel from the cutting edges to the central portion of each blade, while the remainder, or more than half the diameter of each blade, in the direction of movement of each onion, extend divergently away from each other to thereby clear the onion. By this arrangement the blades may start to return to their normal spaced relation before the onion has moved half way across the blades, instead of the blades being held apart by the onion for a distance equal to the full diameter of the onion.

After each onion has passed the cutters 143, cam track 76 is brought progressively closer to the axis of shaft 7 until the body of each onion is pushed off the tines by engagement with the outer peripheral surface of cam 97 and thereafter the tine carrier is again rotated as roller 123 moves in slot 116 back to portion 117, preparatory to movement to the impaling position.

Each onion forced off the tines will drop into a hopper 160 (FIG. 1) for discharge therefrom or for deposit onto a conveyor for carrying away for further processing, such as slicing for dehydration or other operations.

In the structure described and shown, the space between the upper surfaces of strips 39 provides for clearance of any particles that may be separated from the onions and for passage of the stem portion where onions are rolled end-over-end. The projections 40 on the strips 39 are resilient to the extent that they will yield before any pressure of an onion thereagainst would result in injury to the latter, but they provide substantially planar onion supporting surfaces over which the onions are slid without injury to the onions, but with sufficient resistance to cause the onions to roll thereon until oriented.

The recess 47 in the underside of each holder is important. The body of the onion and the stub-stem are relatively large in diameter as compared to the stems on fruit, hence the recess will hold the stub-stem once it is in trailing position below the holder, irrespective of whether or not the strips 39 are spaced or connected or extend divergently upwardly from their adjacent edges.

FIG. 17 shows an expandable onion engaging member similar to that of FIG. 6, except that a single supporting bar 165 extends across its upper side, and separate legs 166 similar to legs 48 are pivotally connected at 167 for adjusting the spacing between said legs to the dot-dash line positions as indicated in FIG. 17, bolts 169 extending through slots 170 for securing the legs in adjusted positions. By this structure the onion engaging members may be adjusted to take quite large onions.

While I have illustrated and described the invention in detail, I do not wish to limit myself to the precise details so shown and described, but desire to avail myself of such variations and modifications as may come within the scope of the appended claims.

I claim:

1. The method of orienting onions each having an elongated central body, a root-stem axis longitudinally thereof, and a relatively rigid stub-stem and root base on said axis at opposite ends of said body with said stub-stem projecting from the latter for trimming said stub-stem and root base therefrom, comprising the steps of:
   (a) supporting said onions for rolling in one direction in a path of travel on a stationary friction surface extending longitudinally of said path in spaced side-by-side relation with the stub-stems projecting in any of random directions relative to said one direction and with the area ahead of each onion free from obstruction to free movement of its stub-stem during rolling of the onion,
   (b) rolling each onion on said surface in said one direction until said stem is in trailing relation to the direction of movement of said onion in said one direction,
   (c) continuing movement of said onion on said surface and at the same time holding the stem in said trailing relation and holding the onion centered in said path for a predetermined distance with its root end in a leading position, and with the root-stem axis of said onion in a vertical plane substantially centrally of and extending generally longitudinally of said path, then
   (d) removing said onions, in succession, from said friction surface immediately following said predetermined distance and then pushing the body of each onion at its trailing side generally in said one direction on a central surface in said vertical plane with each body having its root-stem axis substantially in said vertical plane balanced on said central surface and projecting laterally to opposite sides of said central surface, whereby a body not so balanced by reason of its root-stem axis extending transversely of said vertical plane will fall to one side or the other of said central surface, and
   (e) thereafter removing each onion from said central surface and simultaneously severing the stub-stem and root-base from each body in parallel, spaced, vertical planes.

2. The method as defined in claim 1 in which:
   (f) the removal of said onions from said central surface being done by impaling the body of each onion in a direction generally perpendicular to its longitudinal axis and continuing movement of each impaled onion in said path generally in said one direction, then
   (g) rotating each impaled onion during said continuing movement following removal from said central surface to a position in which its root-stem axis is in plane perpendicular to said vertical plane in which it is moving for said severance of said stub-stem and root-base from the body of each onion.

3. In apparatus for orienting onions, each having a main body and a stub-stem projecting from said body and substantially rigid with said body, which apparatus includes a generally horizontally extending elongated support having a friction surface for rolling each onion thereon in a path extending longitudinally thereof and a body engaging, moving and orienting element supported over said support for movement in one direction longitudinally of said support for engaging and rolling an onion ahead of said element on said support, the improvement comprising:
   (a) means on the leading side of said element for guiding the stub-stem on an onion rolled thereby on said support to a position below said element in trailing relation to the body of said onion, and
   (b) a depression means on said element facing said support for receiving and for holding said stub-stem in said trailing relation during movement of said element in said one direction.

4. In apparatus as defined in claim 3:
   (c) said support being generally V-shape in cross-sectional contour and inclined upwardly in said one direction and said friction surface being on the generally upwardly facing side of said V with the apex of the latter being open for passage of loose particles therethrough.

5. In apparatus as defined in claim 3:
   (c) said element being formed with a recess having an open side facing said one direction and a closed end opposite to said open side, the sides of said recess to said closed end and the open side of said recess being greater than the diameter of the onion to be oriented, for receiving such onion in said recess,
   (d) said means for guiding said stub-stem to said trailing relation including the sides of said recess, said means facing said support for receiving and for holding said stub-stem being a downwardly opening notch.

6. In apparatus as defined in claim 5;
   (e) said element being of generally U-shaped in top plan view providing a pair of laterally spaced legs extending generally longitudinally of said path connected at their trailing ends and having terminal free leading ends, (f) the portion of said element providing said closed end being formed with a downwardly opening notch in which said stub-stem is adapted to be held during movement of said onion in said one direction, and (g) a leg on said element along the upper side of said notch adapted to partialy support said body thereon during said movement of said element in said path.

7. In apparatus as defined in claim 5;

(e) said support being a pair of parallel strips inclined longitudinally relative to horizontal and said body engaging and moving element being positioned with its said recess facing toward the upper ends of said strips, whereby a body on said strips ahead of said element will roll into said recess, (f) said strips and their friction surfaces terminating at the upper ends of said strips, and a horizontally extending member at said upper ends disposed in said vertical plane for receiving thereon from said terminating ends of said strips the body of an onion moved to said upper ends by said element, (g) means connected with said element for continuing movement thereof and a body in the recess in said element over and past said member, said member being relatively narrow in its horizontal width to support thereon for said movement thereover only a body having its stem-root axis in said vertical plane balanced thereon, whereby a body not positioned in said balance on said member will fall therefrom to one side or the other thereof, while an element so positioned will remain thereon.

8. In apparatus as defined in claim 5;

(e) said support and soid friction surfaces terminating in a terminal discharge end from which said onions are moved by said element, and impaling means adjacent to said terminating ends for impaling a body moved to said terminating ends by said element, (f) means supporting said impaling means for movement thereof, and a body impaled in the latter in a path of travel extending away from said strips and said element, (g) a pair of spaced, substantially opposed, circular centrally dished cutting blades at oppostie sides of said last-mentioned path providing generally frustoconical outer peripheral marginal portions, and means supporting said blades for rotation about axes slightly inclined relative to horizontal with said marginal portions above said axes substantially parallel in vertical planes for severing said stem and root-base from the body of each onion moved in said last-mentioned path betwen said portions and generally toward the axes of said blades, whereby each body will be free from engagement with said blades upon movement past said marginal portions.

9. Apparatus for trimming the stub-stem and root-base from onions each having a main body and a root-stem axis with said stub-stem projecting from said body, comprising, in combination:

(a) onion orienting means for supporting a row of spaced onions thereon for movement along a generally horizontally extending path of travel including means engaging each onion for rolling it in one direction in said path above different axes until its stub-stem is in trailing relation relative to said movement in said one direction, (b) an onion separator at a point along said path for discharging from said path only an onion, the stub-stem of which is not in said trailing position at said point, (c) onion supporting means beyond said last-mentioned point relative to said onion separation for supporting each oriented onion having its stub end in trailing relation, and for carrying each onion so impaled in a second path away from said separator and from the means for rolling said onions, with its stub-stem and root-base projecting oppositely from said onion supporting means, (d) means for positioning each onion supported by said supporting means with its root-base and stub-stem axis disposed transversely of said second path, and (e) cutting means along said second path for severing said root-base and said stub-stem from the body of each onion after each onion has been positioned with its said axis extending transversely of said second path.

10. In the combintaion as defined in claim 9;

(f) said onion orienting means including a pair of elongated, horizontally extending strips in spaced side-by-side relation on which the bodies of said onions are adapted to roll with said space between said strips for passing the stub-stems to said trailing relation during said rolling.

11. In the combination as defined in claim 10;

(g) said onion supporting means including a pair of onion impaling tines supported for movement into the body of each oriented onion, and the means for positioning each onion with its root-base and stub-stem axis disposed transversely of said second path being connected with said pair of tines for rotating said tines to so position the body impaled thereon.

12. In the combination as defined in claim 11;

(h) said onion separating means being a rail disposed between said strips and said onion supporting means in a position for receiving onions from said strips for movement over said rail longitudinally thereof with oriented onions balanced on said rail and unoriented onions in unbalance thereon for falling to one side or the other of said rail.

References Cited

UNITED STATES PATENTS

| 2,764,351 | 9/1956 | Broscomb et al. | 198—33 X |
| 2,796,967 | 6/1957 | Myer | 198—33 X |
| 3,212,545 | 10/1965 | Aguilar | 146—224 |

WILLIAM S. LADSON, Primary Examiner

Z. R. BILINSKY, Assistant Examiner

U.S. Cl. X.R.

146—238, 83